June 15, 1937.  J. C. CAMPBELL  2,083,774
SENSITIVE VALVE MECHANISM
Filed May 13, 1935
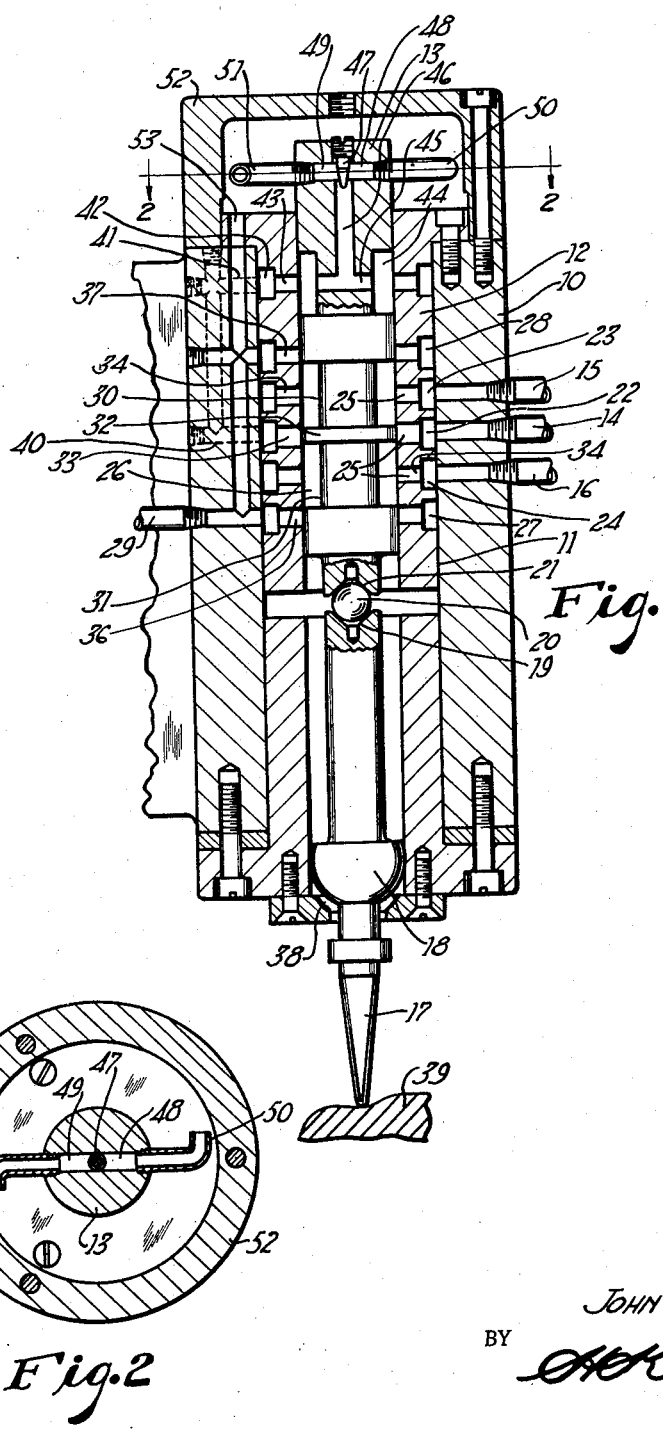
INVENTOR.
JOHN C. CAMPBELL
BY
A. K. Parsons
ATTORNEY.

Patented June 15, 1937

2,083,774

UNITED STATES PATENT OFFICE 2,083,774

SENSITIVE VALVE MECHANISM

John C. Campbell, Cincinnati, Ohio, assignor to The Cincinnati Milling Machine Company, Cincinnati, Ohio, a corporation of Ohio Application May 13, 1935, Serial No. 21,179

1 Claim. (Cl. 137—153)

This invention relates to valves and more particularly to means for improving the sensitivity of control valves.

In the development of hydraulic control mechanisms there has been a growing demand for increased sensitivity in control valves which are utilized for minutely and variably controlling the flow in a circuit as distinguished from ordinary valves which are utilized solely for connecting and disconnecting purposes. The attainment of increased sensitivity has been hampered because of the tendency of a valve plunger to stick after it comes to rest, regardless of how accurate the fits are made or how careful the machine work has been performed in the manufacture of the valve. I refer to the situation in which a movable valve plunger has been carefully lapped in its bushing so that the desired minute film lubricating clearance exists between the plunger and its bore. When such a valve remains stationary for any period of time, it seems to settle in some way into contact with the wall of the bore, necessitating a relatively high initial pressure to start movement thereof again. Although there may be some excuse for this when the plunger lies horizontal, and the attraction of gravity causes it to settle, nevertheless the same thing is true when the valve is supported vertically.

In highly sensitive circuits it is desired that the valve be responsive to small variable forces and that it respond instantaneously thereto. When static friction is present, which seems to be the case when a valve plunger has been at rest for any period of time, it takes a larger initiating force to start movement than would be the case otherwise, and this results in delay in starting with an ensuing acceleration resulting in extra momentum to deal with, which brings about the general result that the valve is sluggish in operation. If the valve is utilized to control the position of a tool, for instance, delay means inaccuracy in the work, and if too great a force is required to start the valve to move, small forces will have no effect on the valve and sensitiveness is lost.

One of the objects of this invention is to provide means for maintaining a valve plunger in a "nascent" condition; that is, free from static friction.

Another object of this invention is to improve the sensitivity of a control valve plunger whereby the same will be responsive to small forces for varying the flow in a control circuit.

A further object of this invention is to provide means for continuously rotating a valve plunger without the necessity of making any external mechanical connections thereto for such purpose.

An additional object of this invention is to provide fluid operable means for rotating a valve plunger which is self-contained in the plunger.

Other objects and advantages of the present invention should be readily apparent by reference to the following specification considered in conjunction with the accompanying drawing illustrative of one embodiment thereof, but it will be understood that any modification may be made in the specific structural details within the scope of the appended claim without departing from or exceeding the spirit of the invention.

Referring to the drawing in which like reference numerals indicate like or similar parts:

Figure 1 is a sectional view showing a valve plunger embodying the principles of this invention.

Figure 2 is a section on the line 2—2 of Figure 1.

In the drawing the reference numeral 10 indicates a valve housing having a central bore 11 in which is fitted a valve sleeve 12. Reciprocably mounted in the valve sleeve is a valve plunger 13.

As an example of a controlling circuit, it may be assumed that the valve housing has a pressure supply channel 14 and a pair of delivery channels 15 and 16 which are connected, for example, to opposite ends of a hydraulic motor whereby when the pressure pipe 14 is connected to the channel 15 the hydraulic motor will be caused to operate in one direction and when connected to the channel 16 the motor will be caused to operate in an opposite direction.

It may be further assumed that it is desired to control the operation of this motor from a tracer 17 which is positioned for scanning a pattern in the conventional manner of operation of pattern controlled, engraving, or profiling machines. This tracer may have an integral hemispherical member 18 by which the tracer is supported for universal movement and the upper end of the tracer is provided with a cavity 19 in which is mounted a ball 20. The lower end of the valve plunger may also be provided with a cavity 21 which engages the upper side of the ball, and the arrangement is such that when the tracer 17 is either laterally deflected or axially moved upward, the valve plunger will also be moved.

This valve plunger may be so formed as to variably control the flow from channel 14 to channels 15 and 16. To this end the sleeve 12 may be provided with annular grooves 22, 23 and 24 so positioned as to be in constant communication with channels 14, 15 and 16, and each annular groove may have radial bores such as 25 formed therein, communicating with the interior bore 26 of the valve sleeve. The sleeve may also have an additional pair of annular grooves 27 and 28 which are in permanent communication with an exhaust channel 29. These annular grooves may also have a series of radial bores 25 communicating with the interior of the valve sleeve bore. The valve plunger 13 may be provided with a pair of annular grooves 30 and 31 thereby forming an intermediate spool 32 which is movable relative to the port 33 for connecting the same alternately to ports 34 and 35. In other words, when the valve plunger moves downward, the port 33 will be connected to the port 34 and the port 35 will be connected to a port 36. This will cause pressure fluid to flow to the channel 15 and will connect the channel 16 to exhaust and the fluid operable motor will be caused to move in one direction. When the valve plunger moves upward, the port 33 will be connected to port 35 to cause pressure fluid to flow in channel 16, and channel 15 will be connected to the exhaust port 37. From this it will be seen that upward and downward movement of the valve plunger will cause reversible operation of the motor. This valve however, is not merely a reversing valve in the ordinary sense of the term, but is adapted to be variably positioned by the tracer for stopping all flow to channels 15 and 16; determining the channel to be connected to pressure; and varying the rate of flow to the connected channel.

It will be apparent that in order for the spool 32 to move in both directions relative to the port 33, that the hemispherical part 18 must be held in a slightly raised position with respect to its seat 38. This is the usual practice of such machines in order that when a depression is reached in the controlling pattern 39, that the tracer may move downward.

If the hydraulic motor connected to channels 15 and 16 is utilized for positioning a tool with respect to a work piece for control by the tracer 17 through the medium of valve plunger 13, it will be apparent that this valve must be a sensitive valve and responsive to slight movements of the tracer and that the more sensitive the valve is and the quicker it is in response to movements of the tracer, the more accurate will the pattern be reproduced. Furthermore, the force required to move the valve should be very small so that the tracer will not bear heavily on the pattern and produce indentations therein which will mar the surface of the pattern and prevent its subsequent use for reproduction purposes. In the present instance, the weight of the valve member 13 and of the tracer 17 are the only things depended upon for maintaining the point of the tracer in contact with the pattern.

It will be apparent that when the surface of the pattern is straight that the spool 32 will be in a central position with respect to the port 33 and no flow in channels 15 and 16 will take place, with the result that the valve 13 will remain at rest. On the other hand, if the surface of the pattern is undulating in nature, the spool will be alternately moved up and down to effect continuous movement of the motor in opposite directions. It is during these periods of rest that a sensitive valve plunger of the nature disclosed tends to adhere in some way to the walls of the bore 26 and increase the force necessary to initiate subsequent movement thereof. The present invention is directed to means for over-coming such a situation and setting up such a condition that the valve has no tendency to stick or adhere to the side walls of its containing bore. This is accomplished by utilizing part of the incoming pressure fluid to operate a re-action turbine which is connected to the valve plunger in such a manner that it will operate to continuously rotate the valve without introducing additional frictional problems.

This take-off from the fluid pressure line consists of a channel 40 which intersects the annular groove 22 and this channel is inter-drilled in the casing 10 and has a terminus at 41 which communicates with another annular groove 42 formed in the sleeve 12. This annular groove has ports 43 which communicate with an annular groove 44 formed in the periphery of the valve plunger. This annular groove is connected by a cross bore 45 to an axial bore 46 which terminates adjacent the upper end of the valve plunger and has an adjustable needle valve 47 inserted in the end thereof. This valve regulates the flow to the radial channels 48 and 49 which terminate as shown in Figure 2 in pipes 50 and 51 respectively, the ends of which are oppositely bent so that as the fluid escapes under pressure through the ends of these tubes, it sets up a reaction causing rotation of the valve plunger in the well-known manner of a reaction turbine.

The housing 10 is provided with a removable cap 52 which incloses the upper end of the valve plunger and serves to collect the oil escaping through the reaction turbine whereby the same will be returned through channel 53 to exhaust pipe 29.

In the operation of the device a source of fluid pressure is connected to channel 14 which immediately flows to the reaction turbine causing rotation of the valve plunger regardless of the position of the tracer, and this continuous rotation apparently creates and maintains a lubricating film of oil between the various spools of the valve plunger and the interior of the bore and it has been found that by this simple expedient the force required to move the plunger is only about twenty-five percent of what it would be without the use of this invention.

There has thus been provided a new and improved means for increasing the sensitivity of a control valve by decreasing the force required to move the same and increasing its spontaniety.

That which is claimed is:

In a valve mechanism the combination of a housing having a bore formed therein, a sleeve fixed in said bore having a plurality of annular grooves formed in the periphery thereof, channels formed in the housing and intersecting the respective grooves, one of said channels being adapted to be connected to a source of pressure, a valve plunger reciprocably mounted in said sleeve and having portions for interconnecting said grooves and varying the flow from said pressure source, a central bore formed in the plunger, a reaction turbine connected to the end of the plunger and interconnected for supply from said central bore, an annular groove formed in said plunger, channel connections between said groove and central bore, and interdrilled channels in the housing interconnecting the pressure groove with said annular groove whereby said turbine will be continuously supplied with fluid pressure regardless of the axial position of said plunger.

JOHN C. CAMPBELL.